(12) United States Patent
Hanson et al.

(10) Patent No.: US 12,216,532 B2
(45) Date of Patent: Feb. 4, 2025

(54) ERROR ATTRIBUTION FOR SYSTEMS PROVIDING ACCESS MANAGEMENT AS A SERVICE

(71) Applicant: Pax8, Inc., Greenwood Village, CO (US)

(72) Inventors: Cody Hanson, Green Bay, WI (US); Jeffrey Wise, Colorado Springs, CO (US)

(73) Assignee: PAX8, INC., Greenwood Village, CO (US)

( * ) Notice: Subject to any disclaimer, the term of this patent is extended or adjusted under 35 U.S.C. 154(b) by 29 days.

(21) Appl. No.: 18/114,142

(22) Filed: Feb. 24, 2023

(65) Prior Publication Data

US 2024/0289203 A1 Aug. 29, 2024

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01); *G06F 11/0769* (2013.01); *G06F 11/0778* (2013.01)

(58) Field of Classification Search
CPC .............. G06F 11/079; G06F 11/0721; G06F 11/0769; G06F 11/0778
See application file for complete search history.

(56) References Cited

U.S. PATENT DOCUMENTS

| | | | |
|---|---|---|---|
| 9,996,888 B2 * | 6/2018 | Gocek | H04L 43/06 |
| 10,325,078 B2 * | 6/2019 | Moore | G06F 21/105 |
| 2013/0019316 A1 * | 1/2013 | Kacin | G06F 21/105 |
| | | | 726/26 |
| 2021/0295223 A1 * | 9/2021 | Freeman | G06F 11/3428 |
| 2023/0231865 A1 * | 7/2023 | Velur | G06F 8/60 |
| | | | 726/25 |

* cited by examiner

*Primary Examiner* — Amine Riad
(74) *Attorney, Agent, or Firm* — Brownstein Hyatt Farber Schreck, LLP

(57) ABSTRACT

A system and method for providing access to third-party software tools as a service. A service access manager can communicate with one or more third parties to manage licenses associated with third-party software tools. A machine learning model can be trained using logs generated by the system and causes of detected errors to automatically determine the cause of errors occurring in the future. Vendor logs generated by software instances instantiated by third-party systems can be collected and used to improve error attribution.

13 Claims, 9 Drawing Sheets

ERROR ATTRIBUTION FOR SYSTEMS PROVIDING ACCESS MANAGEMENT AS A SERVICE

TECHNICAL FIELD

Embodiments described herein relate to access management systems for third-party software tools and, in particular, to systems and methods for automatically or semi-automatically diagnosing, mitigating, and/or resolving issues that occur in the operation of such access management systems.

BACKGROUND

An organization may provide its employees with access to one or more software tools to facilitate collaboration and completion of work. In lieu of developing in-house software tools and services, a typical organization licenses access for its employees to various third-party software tools, such as email services, document storage systems, office suites, design platforms, and so on. To simplify business operations, many organizations (especially small and medium-sized businesses) engage a managed service provider (MSP) to administer, support, and provide access to third-party software tools from one or more third-party software vendors. However, managing organizations as clients, supporting their software deployments, managing software licenses on behalf of organizations, and understanding various billing tiers and discount structures of multiple third-party software vendors is often a cumbersome and time consuming process for both MSPs and organizations alike, often resulting in inefficient over-purchasing by organizations and/or tedious manual management of licenses and provisioning/deployment of services by MSPs.

An access management system for third-party software tools may streamline the provisioning and deployment of third-party software tools by, among other things, allowing MSPs to manage licenses for software tools from multiple third parties in a unified interface. To provide access management as a service, an access management system may communicate with several third-party services to obtain, alter, and cancel licenses for third-party software tools in response to commands issued by an MSP on behalf of an organization. Errors that occur in the operation of such an access management system may be caused by the access management system itself, a third-party service in communication with the access management system, and/or user error from an MSP employee using the access management system. Quickly identifying a likely cause of an error may allow for timely mitigation or resolution of that error and may reduce incident management expenses.

SUMMARY

Embodiments described herein relate to the attribution of errors occurring in the operation of an access management system, and in particular to the automatic attribution of errors occurring in the operation of an access management system. In one embodiment, a server system includes a memory resource and a processing resource. The processing resource may be intercoupled with the memory resource and configured to instantiate an instance of software.

The software may be configured to perform a set of operations to communicate with a third-party system to manage a license for a third-party software tool, generate a set of logs describing the set of operations, and detect the occurrence of an error related to one or more of the set of operations. In response to the detection of the error, the set of logs may be provided as an input to a machine learning model. The machine learning model may be trained using training data including previously generated sets of logs describing previously performed sets of operations of the operations of the instance of software resulting in previous errors and a cause of the previous errors. The software instance may generate, as an output of the machine learning model, a cause of the error.

In one embodiment, the instance of software is further configured to cause a graphical user interface to be displayed, the graphical user interface indicating the cause of the error.

The instance of software may be a backend application instance configured to communicably couple to a frontend application instance instantiated by a client device coupled to the server system. The graphical user interface may be displayed at the frontend application instance.

In one embodiment, the cause of the error indicates whether the error was caused by the software instance or the third-party system.

In one embodiment, the software instance is further configured to collect a set of vendor logs. The set of vendor logs may describe a set of operations of an instance of software instantiated by the third-party system in response to communications with the software instance. The set of vendor logs may be provided along with the set of logs as an input to the machine learning model. The training data may further include previously collected vendor logs describing previously performed operations of instances of software instantiated by the third-party system resulting in previous errors.

In one embodiment, the software instance is further configured to communicate the cause of the error to the third-party system in response to a determination that the error was caused by the third-party system.

In one embodiment, the set of operations for communicating with the third-party system includes generating a request to the third-party system.

In one embodiment, the set of operations for communicating with the third-party system includes providing an interface for receiving communications from the third-party system.

In one embodiment, a server system includes a memory resource and a processing resource. The processing resource may be intercoupled with the memory resource and configured to instantiate an instance of software.

The software may be configured to perform a set of operations to communicate with a third-party system to manage a license for a third-party software tool, generate a set of logs describing the set of operations, and detect the occurrence of an error related to one or more of the set of operations. The software may be further configured to receive, as input, a cause of the error based on the set of logs, and generate training data for a machine learning model based on the set of logs and the cause of the error. The training data may be configured to cause the machine learning model, once trained using the training data, to receive a new set of logs describing a new set of operations of the software instance resulting in a new error as input and provide a cause of the new error as output.

In one embodiment, the software instance is further configured to cause a graphical user interface to be displayed, the graphical user interface showing information about each of the set of logs and a number of user input elements allowing a user to indicate a cause of the error.

The instance of software may be a backend application instance configured to communicably couple to a frontend application instance instantiated by a client device coupled to the server system. The graphical user interface may be displayed at the frontend application instance. The cause of the error may be received from the frontend application instance in response to user interaction with the graphical user interface.

In one embodiment, the software instance is further configured to collect a set of vendor logs. The set of vendor logs may describe a set of operations of an instance of software instantiated by the third-party system in response to communications with the software instance. The cause of the error may be further based on the vendor logs. The training data may further include the vendor logs.

In one embodiment, the software instance is further configured to train the machine learning model using the training data.

In one embodiment, a server system includes a memory resource and a processing resource. The processing resource may be intercoupled with the memory resource and configured to instantiate an instance of software.

The software may be configured to perform a set of operations to communicate with a third-party system to manage a license for a third-party software tool, generate a set of logs describing the set of operations, collect a set of vendor logs, and detect the occurrence of an error related to one or more of the set of operations. The set of vendor logs may describe a set of vendor operations of an instance of software instantiated by the third-party system in response to communications with the software instance. The software instance may be further configured to determine a cause of the error based on the set of logs and the set of vendor logs.

In one embodiment, collecting the set of vendor logs comprises providing an interface for receiving the set of vendor logs from the third-party system.

In one embodiment, collecting the set of vendor logs comprises receiving the set of vendor logs as a response to a request provided to the third-party system.

In one embodiment, the instance of software is further configured to cause a graphical user interface to be displayed, the graphical user interface indicating the cause of the error.

The instance of software may be a backend application instance configured to communicably couple to a frontend application instance instantiated by a client device coupled to the server system. The graphical user interface may be displayed at the frontend application instance.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
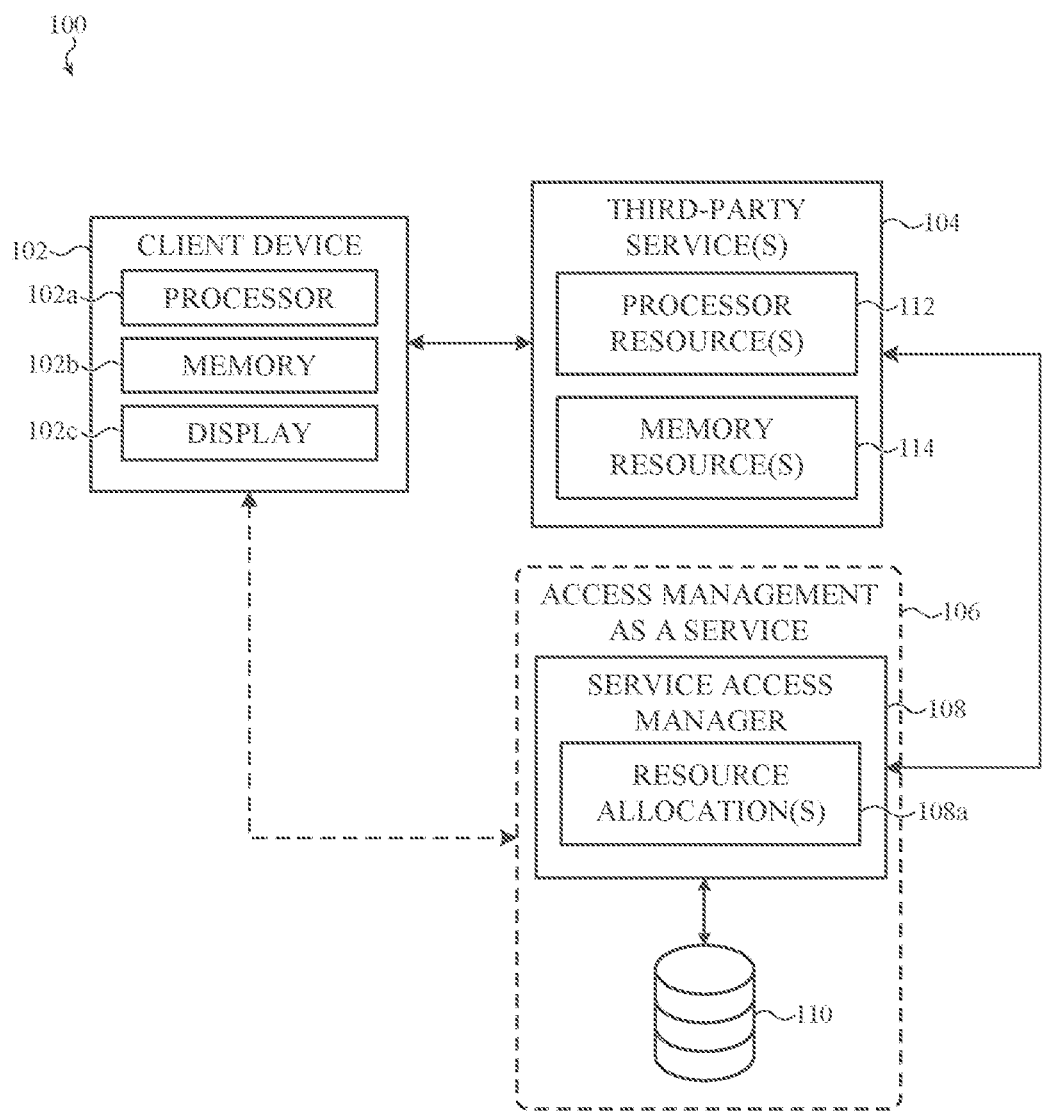
FIG. 1 depicts a system for providing access management as a service, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to computing systems, computer architectures, and computer-implemented methods configured to provide, control, and manage access to third-party software tools.

In particular, embodiments described herein relate to systems and methods for determining a cause or causes of errors occurring in the operation of an access control system for third-party software tools.

More specifically, a system described herein communicates with third-party software providers (either by accessing third-party software provider API endpoints and/or by providing an interface for communication with third-party software providers) to provide, control, and manage access to third-party software tools as a service via a unified interface. Such a system may drastically simplify license management and other functions of MSPs on behalf of the organizations engaging them. Errors occurring in the operation of the system may be caused, for example, by the system itself, by a system operated by a third-party software provider in communication with the system, or by user error of an MSP using the system. Determining a cause of errors in the system may be difficult due to the variety of ways the system communicates with various third-party software providers and inconsistencies in error messages received therefrom.

In particular, it may be difficult to determine if the error was caused by the system itself, by a third-party system, or by user error. As discussed in detail herein, sets of logs describing operations of the system during the occurrence of errors may be classified based on a cause of the error and subsequently leveraged as training data for a machine learning model that, once trained, is able to automatically classify errors based on logs associated with the errors. Accordingly, system engineers may be notified when an error is caused by the system, third-party software providers may be notified when an error is caused by a system associated therewith, and/or users of the system may be prompted to correct one or more issues in their usage of the system when an error is caused by user error. In some embodiments, an access management system may receive or otherwise obtain sets of vendor logs describing operations of systems operated by or on behalf of third-party software vendors performed in response to communications with the access management system. The vendor logs may be combined with logs generated by the access management system and used to determine the cause of one or more errors as discussed herein.

Embodiments described herein simplify MSP workflows by providing a centralized interface configured to manage different third-party software tools and licensing structures for organizational clients of that MSP. The centralized interface may communicate with various third-party software management tools, either by communicating with multiple third-party software vendor APIs or by providing an interface by which third-party software vendors can communicate. An MSP can leverage such a system to simplify billing and license management for multiple small and medium-sized businesses, which in turn can free up time and bandwidth for the MSP to service more organizational clients and/or to provide more hands-on support to existing clients.

While providing significant benefit for MSPs and organizations alike, the unique operational requirements of such an access management system may make diagnosing errors occurring in the operation thereof difficult without human intervention. Errors may be caused by bugs in the codebase of the access management system itself, an outage of the access management system, bugs in the codebase of a system operated by or on behalf of a third-party software vendor in communication with the access management system, an outage of such a system operated by or on behalf of a third-party software vendor, user error on behalf of an MSP using the access management system, or some combination thereof.

Systems and methods described herein may use sets of logs describing operations of the access management system during the occurrence of an error along with a classification of a cause of the error to train a machine learning model for automatically determining a cause of errors occurring in the future. Further, an access management system described herein may receive or otherwise obtain sets of vendor logs describing operations of third-party systems operated by or on behalf of third-party software vendors in response to communication with the access management system, and use these vendor logs, along with logs generated by the access management system, to determine the cause of one or more errors.

As an example, a system described herein may perform a set of operations to obtain a new license to a third-party software tool. In the course of doing so, the system may communicate with a system operated by or on behalf of the third-party, for example, by making an API call to an API endpoint operated by or on behalf of the third-party. Each of the set of operations may be performed by one or more processing resources executing software instructions stored in one or more memory resources, which are operably coupled to the one or more processing resources. In the course of the operations, logs may be generated describing various aspects of the operations. For example, a log may be generated upon initiation of the process to obtain the new license indicating that the process has been initiated. A subsequent log may indicate that communication is being initiated with the third-party API endpoint, and include details such as a number of request parameters included in a request to the API endpoint. A subsequent log may indicate that the third-party API endpoint returned an error. The error may be in the form of an HTTP status code, or may include more detailed information (e.g., in a response body).

Notably, the logs generated during an operation to obtain a new license (or more generally to perform any operation) for one third-party software vendor may be quite different from the logs generated during the same operation for a different third-party software vendor. Further, different software vendors may report errors in different ways. For example, a first third-party software vendor may report a request made with incorrect customer information as forbidden with an HTTP 403 response code, while a second third-party software vendor may report the same request as a valid request with an HTTP 200 response code but indicate in the response body that the customer information was invalid. Accordingly, determining a cause of an error without human intervention, for example, using hard-coded pattern detection, may be difficult and/or labor intensive, requiring bespoke error detection patterns for each type of operation (e.g., obtain license, cancel license, modify license, view licenses, etc.) for each third-party software vendor supported by the system.

To solve the aforementioned problems, a system described herein may facilitate the classification of sets of logs associated with errors by generating a user interface displaying a set of logs describing operations of the system during the occurrence of an error and a number of user input elements allowing a user to classify or otherwise specify a cause of the error. For example, the user interface elements may allow a user to specify that the error was caused by the system itself, by a system operated by a third-party software vendor in communication with the system, or by user error. Notably, the error may be classified into any number of categories, including into a hierarchical classification, indicating a type of cause of the error. Those skilled in the art may appreciate that the classification or cause of the error may act as a label for the set of logs associated therewith to form a labeled data set. Users experienced with the system may be capable of determining a cause of an error based on the set of logs associated therewith, and thus the system may facilitate the classification of errors in a straightforward fashion.

Once a sufficient amount of logs have been appropriately classified/labeled, the sets of logs and associated causes of errors may be used as training data for a machine learning model. In particular, a machine learning model may be trained in a supervised fashion using the sets of logs and associated causes of errors to provide a machine learning model capable of receiving a set of logs as input and providing a cause of the error as output. For example, the machine learning model may receive a set of logs as input and indicate whether the error was caused by the system, by a system operated by or on behalf of a third-party software vendor, or by user error. Appropriate action can then be taken to mitigate or resolve the error, such as alerting an engineering team associated with the system, alerting the third-party software vendor, or guiding the user to correctly use the system.

In addition to or in place of the use of a machine learning model trained to determine causes of errors occurring in the system based on logs generated by the system, the system may also be configured to receive or otherwise obtain vendor logs from third-party systems operated by or on behalf of third-party software vendors. The vendor logs may describe operations of the third-party systems performed in response to requests or commands issued from the system. For example, the vendor logs may describe a set of operations performed by the third-party system to obtain a license for a third-party software tool, cancel a license for a third-party software tool, modify a license for a third-party software tool, or report on the status of one or more licenses of third-party software tools. The vendor logs may be required as a parameter to one or more API endpoints instantiated by the system, or as part of a response to a request to one or more third-party API endpoints operated by or on behalf of a third-party software vendor. In some embodiments, the vendor logs are part of a standardized request or response dictated by the system.

The vendor logs may provide additional context to various operations performed by the system (e.g., to obtain, modify, or cancel a license or licenses, enumerate license information), allowing for easier attribution of errors that occur in the operation of the system. The vendor logs may thus be used along with hard-coded error detection patterns to enable more robust error cause detection, or may be used along with the logs generated by the system as discussed above to train a machine learning model, which is capable of automatically determining a cause of errors that occur in the future.

FIG. 1 depicts a system 100 for providing access management as a service, such as described herein. The system 100 can include, in a simplified architecture, and/or be defined by communications by and between, a client device 102, a third-party service 104, and an access management service 106.

The client device 102 can be any suitable electronic device. Examples include, but are not limited to, cellular phones, laptop computers, desktop computers, server computers, and so on. More generally, the client device 102 may be any electronic device or computing resource configured to communicably intercouple (e.g., via one or more networks) to one or more other electronic devices, such as a server computer instantiating an instance of a third-party service 104 or a server computer executing an instance of the access management service 106.

In some cases, the access management service 106 can be operated to, among other operations, request provisioning of licenses to access the third-party service 104 on behalf of a user of the client device 102. For example, the access management service 106 can be configured to leverage an API of the third-party service 104 to automatically request provisioning/issuance of one or more licenses to access the third-party service 104.

In many constructions the access management service 106 and the third-party service 104 are each implemented as instances of software executing over one or more virtual or physical resources associated with a cloud-based infrastructure, such as may be provided by a cloud services provider. In these embodiments, processing resources associated with, and/or allocated to, a particular server instance can cooperate with memory resources associated with the server instance to execute one or more computer readable instructions to instantiate an instance of software defining and/or implementing the third-party service 104 or the access management service 106.

More generally, although it may be appreciated that the third-party service 104 and the access management service 106 may be implemented in any number of ways and may be configured to communicate over a variety of protocols, in many embodiments each is implemented as a separate instance of cloud-based software supported by separate infrastructure.

It may be appreciated that the third-party service 104 can serve as a host of any suitable software product. Examples include, but are not limited to, email services, messaging services, instant messaging services, documentation services, office product services, word processing services, securing services, database services, design services, translation services, music and/or video production services, information technology infrastructure management services, and so on. These examples are not exhaustive.

As noted above, an access management service such as the access management service 106 can be configured to request and revoke software licenses to particular software products, such as to the third-party service 104. In addition, the access management service 106 can be configured to facilitate access to one or more functionalities of one or more third-party APIs (such as API endpoints provided by the third-party service 104). For example, the access management service 106 can be configured to access a license usage statistics API endpoint of a particular third-party API of the third-party service 104, or, in some embodiments, provide an interface by which the third-party service 104 can report license usage data to the access management service (e.g., provide an API endpoint at which the third-party service 104 can report license usage data).

More particularly, the access management service 106 can include a service access manager 108 in communication with a database 110 storing information regarding how to interface with one or more third-party services. As a result of this construction, the service access manager 108 can be configured to access the database 110 to determine how to interface with one or more third-party services.

In some examples, the access management service 106 and/or the service access manager 108 can be leveraged by an MSP to generate invoices based on the use of the third-party service 104 by a user of the client device 102. In other cases, the access management service 106 and/or the service access manager 108 can be leveraged by an MSP to generate invoices based on the use of the third-party service 104 by an organization associated with the client device 102. In other cases, the access management service 106 can be used by an MSP to support an organization's third-party licensing needs, such as described above.

As noted above, an organization may engage an MSP and/or a value-added reseller (VAR) to license access to, and/or actively administer, one or more third-party software tools, which may be referred to herein as "collaboration tools." Example collaboration tools include email services, telephony services, instant messaging systems, documentation systems, word processing systems, information technology management systems, ticketing systems, issue tracking systems, incident response systems, software repositories, design platforms, video and/or audio production platforms, networking platforms, identity management systems, and so on. A person skilled in the art may appreciate that these example collaboration tools are not exhaustive of all types of software tools that may be licensed by an organization for use by one or more employees; an organization may license access to collaboration tools developed and maintained by different third-party software providers (herein, software "vendors").

As an organization's collaboration tool library (and/or employee headcount) grow, licensing costs likewise increase as does the importance of active license management. Phrased another way, organizations and MSPs/VARs may often be tasked with regular auditing whether licenses are actively being used to identify unused licenses that can be terminated. The access management service 106 may streamline these tasks, ensuring that the correct number of licenses for an organization are maintained over time.

As discussed above, errors may occur in the course of operating the access management service 106. These errors may be caused by bugs in the code base of the access management service 106, an outage of the access management service 106, bugs in the code base of the third-party service 104, an outage of the third-party service 104, and/or user error of a user of the access management service 106 (e.g., a user of the client device 102). This list is not exhaustive; any number of causes may exist for a particular error. Since the access management service 106 may communicate with myriad third-party services 104, each in a different way, it may be difficult or resource intensive to determine a cause of a particular error without human intervention (e.g., using hard-coded pattern detection).

For example, the access management service 106 may generate logs describing various operations thereof. In the course of performing the same operation for two different third-party services 104 (e.g., provisioning a license for a third-party software tool), the generated logs may be significantly different, because the access management service 106 may communicate in different ways with different third-party services 104, and further may use custom logic to interact with each third-party service 104, which may be developed by different engineering teams. Further, different third-party services 104 may report the same error or types of errors to the access management service 106 in different ways. Accordingly, when an error occurs, it may be difficult to ascertain the cause of the error in the same way for the different third-party services 104. That is, a single pattern may not be capable of determining the cause for errors while interacting with different third-party services 104, necessitating the use of bespoke patterns for determining a cause of errors in each third-party service 104 the access management service 106 interacts with. Since the access management service 106 may communicate with myriad third-party services 104 to provide a unified interface for managing licenses to third-party software tools, such bespoke error detection patterns may quickly become difficult to write and maintain.

In an effort to simplify error attribution in the access management service 106, the access management service 106 may be configured to facilitate classification of sets of logs describing operations of the access management service 106 during the occurrence of an error. In particular, the access management service 106 may be configured to present or otherwise cause to be presented a graphical user interface showing a set of logs describing operations of the access management service 106 (and, optionally, vendor logs describing operations of the third-party services 104 in response to communications with the access management service 106) during the occurrence of an error and a number of user input elements allowing a user to classify or otherwise specify a cause of the error. For example, the user interface elements may allow a user to specify that the error was caused by the system itself, by a system operated by a third-party software vendor in communication with the system, or by user error.

Once a sufficient amount of logs have been appropriately classified/labeled, the sets of logs and associated causes of errors may be used as training data for a machine learning model. The trained machine learning model may be capable of receiving a set of logs describing operations of the access management service 106 (and, optionally, vendor logs describing operations of the third-party services 104 in response to communications with the access management service 106) and providing a cause of the error as an output. For example, the machine learning model may receive a set of logs as input and indicate whether the error was caused by the access management service 106, by the third-party service 104, or by user error as an output. Appropriate action can then be taken to mitigate or resolve the error.

In addition to or in lieu of the above, the access management service 106 may also be configured to accept vendor logs from third-party services 104 in communication therewith. In one embodiment, the access management service 106 may instantiate an API endpoint for receiving vendor logs from the third-party services 104. In another embodiment, the access management service 106 may receive vendor logs in response to a request provided to an API endpoint instantiated by a third-party service 104. The vendor logs may describe operations of the third-party service 104 in response to requests or commands issued from the access management service 106, and thus may provide insight into why or at what point a particular operation failed. Accordingly, the vendor logs may be combined with logs generated by the access management service 106 to determine the cause of one or more errors, either using hard-coded error detection patterns (which may be more feasible due to the additional context provided by the vendor logs), or may be used along with a machine learning model as discussed above to determine the cause of errors. The vendor logs may be required as part of a standardized request or response for communication with third-party services 104 by the access management service 106.

Regardless of how the cause of an error is determined, the access management service 106 may take any number of different actions based on the cause of an error. Examples include alerting a member of an engineering team associated with the access management service 106 that an error has occurred, alerting the third-party operating or otherwise associated with the third-party service 104, alerting a user of the access management service 106, guiding a user of the access management service 106 to correct an error associated with usage thereof, displaying a graphical user interface accomplishing any of the above, or any other action.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, the access management service 106 may use any suitable architecture for communicating with the third-party service 104. In one embodiment, custom functions are used to access third-party APIs, each of which is tailored to a particular third-party API or APIs. This may not be required if third-party software vendors implement common or industry-standard APIs. In some cases, a backend application instance may be configured to host an API or set of APIs that third-party vendors communicate with in order to relay information relating to the licensing and/or usage of third-party software tools. In yet other examples, a monolithic, microservice, or hybrid architecture may be used. In short, the access management service 106 may provide the functionality described above in any suitable manner, and have any suitable system architecture.

Further, it may be appreciated that the client device 102 can be configured in any number of suitable ways. In one embodiment, the client device 102 is an electronic device that includes a processor 102*a*, a memory 102*b*, and a display 102*c*. The processor 102*a* and the memory 102*b* cooperate to instantiate an instance of software that can be configured to communicate with and/or exchange information with the service access manager 108 and/or the third-party service 104. In some examples, the instance of software may be referred to as a client application and/or frontend that corresponds to a backend instance operated at the third-party service 104 and/or the service access manager 108.

Similarly, the service access manager 108 may be one or more instances of software executing over one or more resource allocations 108*a*. The resource allocations 108*a* may be physical or virtual, and may be associated, for example, with a cloud-based infrastructure, such as may be provided by a cloud services provider. The resource allocations 108*a* may include processing resources cooperating with memory resources to execute one or more computer readable instructions to instantiate one more instances of software defining and/or implementing the service access manager 108.

The third-party service 104 may similarly be one or more instances of software executing over one or more processor resources 112 in connection with one or more memory resources 114. The processor resources 112 and the memory resources 114 may be physical or virtual, and may be associated, for example, with a cloud-based infrastructure, such as may be provided by a cloud services provider. Generally, the processor resources 112 and the memory resources 114 of the third-party service 104 are different from the resource allocations 108*a* of the service access manager 108, as the third-party service 104 and the service access manager 108 are different instances of software supported by separate infrastructure. The processor resources 112 may execute one or more computer readable instructions from the memory resources 114 to instantiate one or more instances of software defining and/or implementing the third-party service 104.

Figure 2:
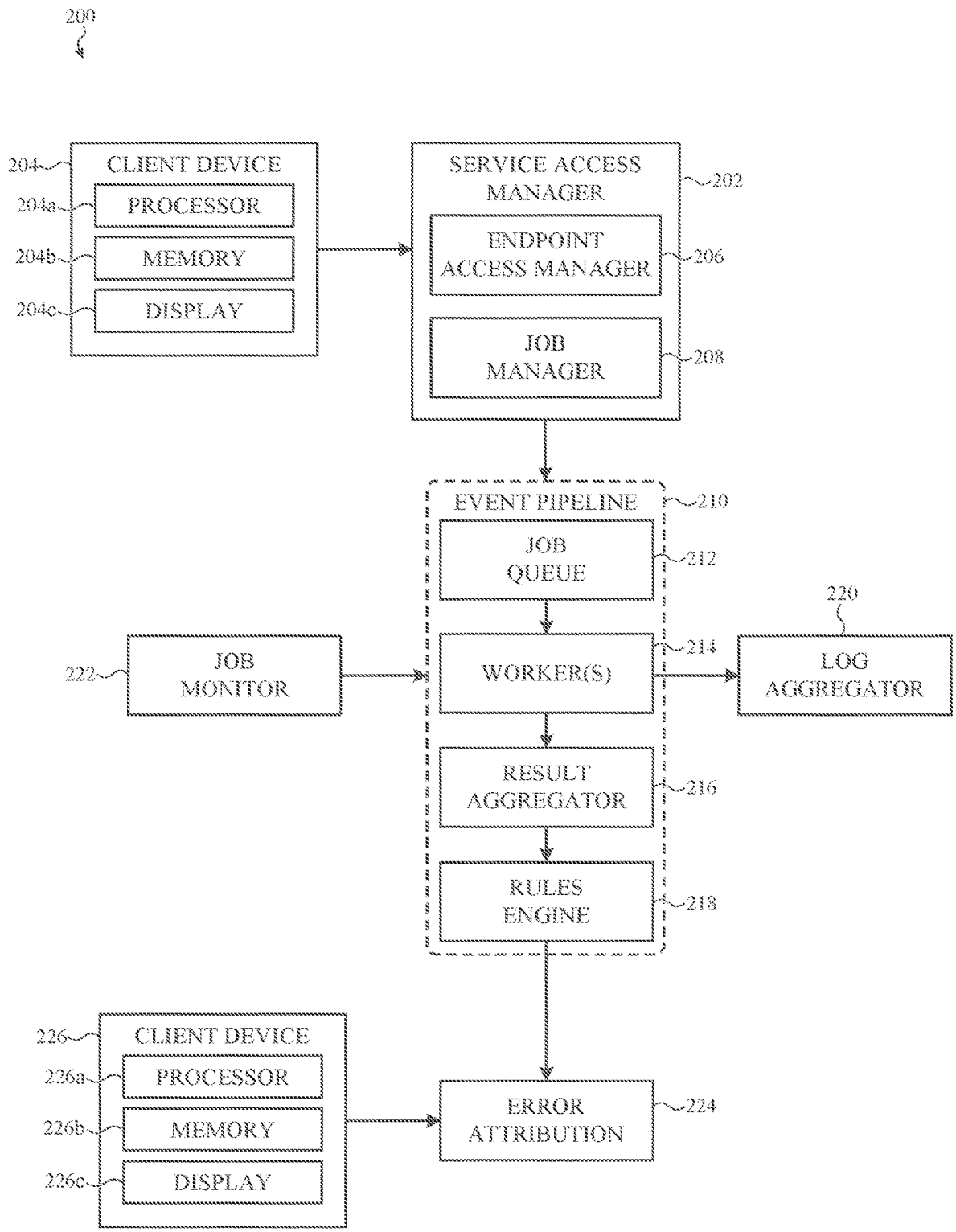
FIG. 2 depicts a system diagram of a system configured to provide access management as a service with automatic error attribution, such as described herein.

FIG. 2 depicts a system diagram of a system 200 configured to provide access management as a service with error attribution.

As with other embodiments described herein, the system 200 includes a service access manager 202 which may be configured to receive command and control instructions from a device operated by an MSP, such as a client device 204. The MSP operating the client device 204 can issue instructions to the service access manager 202 on behalf of an organizational client of the MSP to provision one or more licenses to one or more third-party software tools, cancel one or more existing licenses to one or more third-party software tools, or obtain usage information about one or more third-party software tools, among other things.

In many cases, the client device 204 can be an electronic device such as the client device 102 of FIG. 1; the client device 204 can include a processor 204*a*, a memory 204*b*, and/or a display 204*c* that are configured to instantiate an instance of software configured to receive command and control instructions from a user (MSP) of the client device 204. More simply, the client device 204 can be configured in a similar manner as the client device 102 of FIG. 1, and thus any additional description thereof is not repeated.

Upon receiving an instruction from the client device 204, and/or in response to the occurrence of a scheduled event, the service access manager 202 can be configured to access one or more functions from an endpoint access manager 206. Each retrieved function can thereafter be wrapped, with appropriate arguments, into a job by a job manager 208.

Each job created by the job manager 208 can be added as input to an event pipeline 210, which can include a job queue 212. Job items or work items can be added to and removed from the job queue 212 in any suitable order. One or more worker nodes 214 can be configured to pop jobs from the job queue 212 to execute those jobs/work items against respective third-party APIs. In this manner individual functions, configured with suitable functions, can be executed in series and/or asynchronously.

Once a job successfully executes, the results of the execution can be passed to and/or otherwise received by a result aggregator 216. The result aggregator 216 can, in turn, bundle results of execution of one or more jobs as a single structured data object and can provide that structured data object to a rules engine 218, which may apply one or more rules to the structured data (e.g., as data transforms), based on the MSP initiating the job and/or the organization on behalf of which the MSP is acting.

For example, usage data obtained for a particular organization or user by a particular job (scheduled/instructed by an MSP operating the client device 204) from a particular third-party API can be provided as input to the rules engine 218, which may apply one or more MSP or organization specific rules to calculate a cost associated with that determined usage. In other words, different licenses may be negotiated by an MSP on behalf of an organization having different terms; similar usage under different license structures may result in different costs, which may be applied by and/or managed by the rules engine 218.

Output from the rules engine 218 can be provided as input to an invoicing system that can be configured to generate invoices on behalf of the MSP, bundling different costs of a particular organization's use of multiple third-party software tools and creating invoices corresponding to the organization's license structures with respect to the third parties. Thereafter, the MSP may receive, back at the client device 204, an invoice for a particular organization that aggregates, based on usage data obtained by querying (with one or more jobs) each respective third-party software tool licensed by the organization, costs for that particular organization.

As discussed above, the results of the execution of each function may include vendor logs describing operations of a third-party system in response to requests or commands from the service access manager 202. The vendor logs may be part of a standardized response format dictated by the system 200. The vendor logs may be sent to a log aggregator 220, which may aggregate the vendor logs and logs generated by the system 200 to generate aggregated logs, which describe the operations of the system 200 as well as at least one third-party system in communication therewith. The aggregated logs may provide additional context for operations of the system 200, reducing the complexity of determining the cause of errors occurring in the operation thereof.

An MSP may interact with the service access manager 202 via the client device 204 to obtain licenses for third-party software tools on behalf of an organization, cancel licenses for third-party software tools on behalf of an organization, or obtain usage data about third-party software tools on behalf of an organization. Notably, the event pipeline represents one exemplary way of performing the various tasks that may be performed by the service access manager 202; those skilled in the art will appreciate that the same functionality may be performed using any number of different architectures, all of which are contemplated herein.

A job monitor 222 may be configured to monitor execution of each job by each worker node 214 to determine whether the worker nodes 214 execute the jobs successfully. In an event that the job monitor 222 determines that a particular job has failed, the job monitor 222 may collect a set of logs (which may be aggregated logs including vendor logs) describing operations of the system 200 (including the endpoint access manager 206, the job manager 208, the job queue 212, the worker nodes 214, third-party systems, or any other part) and provide the set of logs to an error attribution system 224. The set of logs may be selected or filtered from a larger pool of logs based on some selection criteria, such as a temporal proximity to the occurrence of the error, a number of logs preceding or following the error, or any other criteria. The error attribution system 224 may provide several functions to facilitate the automatic attribution of errors. First, the error attribution system 224 may facilitate the classification of sets of logs describing operations of the system 200 during or around the occurrence of an error. Second, the error attribution system 224 may automatically determine the cause of errors.

Regarding the first function, the error attribution system 224 may cause a graphical user interface to be displayed at an additional client device 226 to facilitate classification of a set of logs associated with an error. The additional client device 226 may be an electronic device including a processor 226a, a memory 226b, and/or a display 226c that are configured to cooperate to instantiate an instance of software configured to display a graphical user interface for the facilitation of classification of sets of logs. The additional client device 226 may be configured in a similar manner as the client device 204 and/or the client device 102 of FIG. 1, and thus any additional description thereof is not repeated.

In particular, the error attribution system 224 may communicate with or otherwise cooperate with software instantiated on the additional client device 226 to display a graphical user interface showing the set of logs and additional user interface elements allowing a user of the additional client device 226 to classify the logs based on a cause of the error. Individuals familiar with the system 200 may readily recognize the cause of errors based on logs generated when the error occurred, and thus the error attribution system 224 may provide a streamlined way to associate a cause of an error with logs that were generated during the error.

Those skilled in the art will appreciate that sets of logs, along with a classification of a cause of an error occurring when the logs were generated, may form a labeled data set that may be used as training data for a machine learning model. The first function may be performed as part of an initial training phase, and cease once it is determined that an adequate number of data points have been achieved, or may be performed on an ongoing basis such that the training data is continuously or periodically updated.

With regard to the second function, the error attribution system 224 may be configured to use the sets of logs and associated causes of errors as training data for a machine learning model. Once trained, the machine learning model may accept a set of logs as input and provide a cause of an error that occurred during the course of the logs as an output. Using a machine learning model trained using the sets of logs and associated causes of error provides a flexible approach to error attribution that can accurately determine the cause of an error regardless of the third-party system the system 200 is interacting with.

These foregoing embodiments depicted in FIGS. 1-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
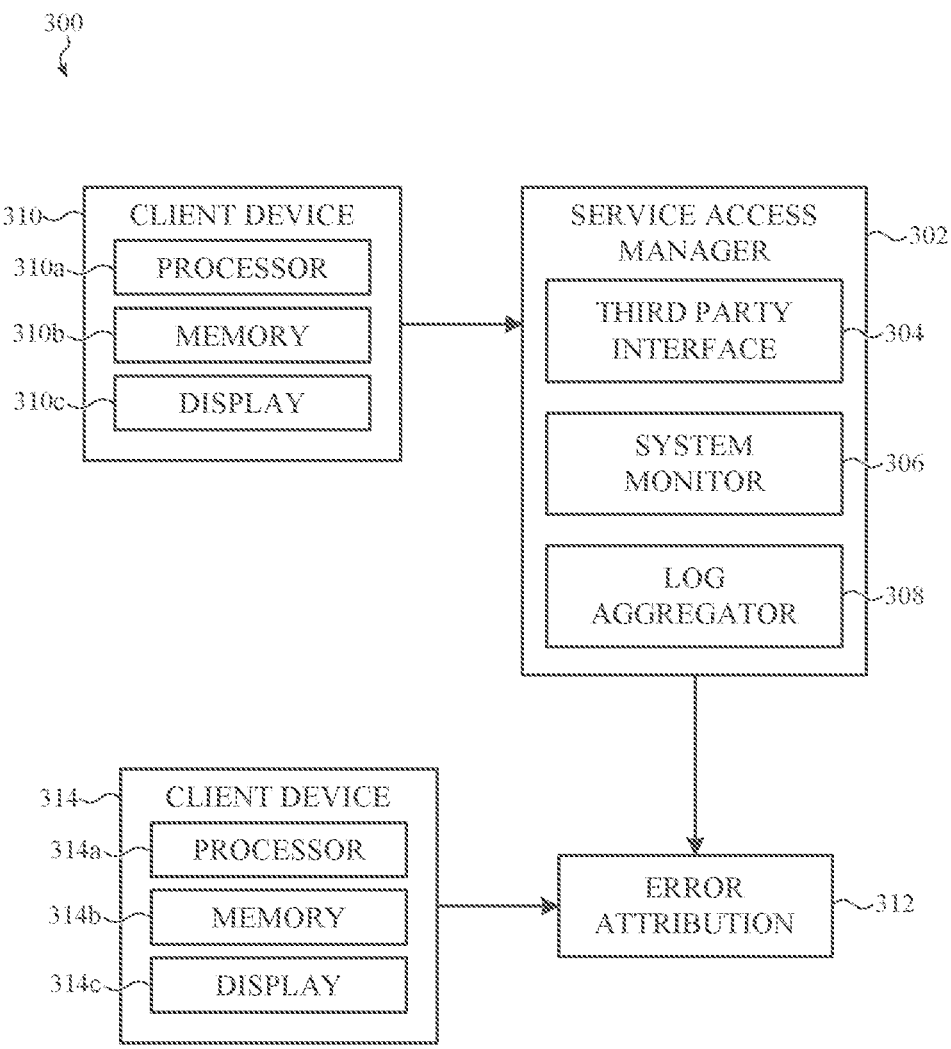
FIG. 3 depicts an alternative system diagram of a system configured to provide access management as a service with automatic error attribution, such as described herein.

FIG. 3 depicts an alternative architecture for a system 300 to the one described above in FIG. 2 wherein a service access manager 302 includes a third-party interface 304, a system monitor 306, and a log aggregator 308.

Similar to that described above, the service access manager 302 may receive command and control instructions from a device operated by an MSP, such as a client device 310. The MSP operating the client device 310 can issue instructions to the service access manager 302 on behalf of an organizational client of the MSP to provision one or more licenses for the organization to one or more third-party software tools, cancel one or more existing licenses to one or more third-party software tools, or obtain usage information about one or more third-party software tools, among other things.

In many cases, the client device 310 can be an electronic device including a processor 310a, a memory 310b, and/or a display 310c, which operate as described above.

Upon receiving an instruction from the client device 310, and/or in response to the occurrence of a scheduled event, the service access manager 302 can be configured to communicate with a third-party service (e.g., via a third-party API) to provision licenses, cancel licenses, or obtain usage information. The third-party interface 304 may be responsible for initiating communication with the third-party service (e.g., by formulating a request corresponding to an API standard of the third-party service). In some embodiments, the third-party interface 304 may also provide an interface by which third-party services can communicate with the service access manager 302. For example, the third-party interface 304 may provide one or more API endpoints at which third-party services can report usage information about one or more third-party software tools, among other information, to the service access manager 302. In one specific example, the third-party interface 304 may initiate communication with a third-party service in order to provision one or more licenses of one or more third-party software tools. As part of the request to provision these licenses, a reporting API endpoint may be specified, which the third-party service may communicate with in order to report usage data related to the provisioned licenses.

The system monitor 306 may detect the occurrence of errors occurring in the operation of the system 300. The system monitor 306 may be distributed throughout the system 300 as tests or checks in the codebase of the service access manager 302, provided as a standalone sub-system, or otherwise provided in any manner. Once an error is detected, the system monitor 306 may collect a set of logs describing operations of the system 300 and provide the set of logs to an error attribution system 312. The set of logs may be selected or filtered from a larger pool of logs based on some selection criteria, such as a temporal proximity to the occurrence of the error, a number of logs preceding or following the error, or any other criteria. As discussed above, the error attribution system 312 may cooperate with an additional client device 314 including a processor 314a, a memory 314b, and a display 314c configured to operate as discussed above, to facilitate the classification of sets of logs with a cause of an error, and automatically determine the cause of errors occurring in the future.

The third-party interface 304 may provide one or more API endpoints at which third-party services can provide vendor logs describing operations of a third-party system in response to requests or commands issued by the service access manager 302. These API endpoints may be provided as part of an initial request to a third-party API endpoint, after which the third-party system may report vendor logs describing operations of a third-party system relating to the initial request. In other embodiments, vendor logs may be provided as part of a response to a request issued by the service access manager 302. The log aggregator 308 may receive the vendor logs and aggregate them with logs generated by the system 300 to generate aggregated logs. The aggregated logs may provide additional context for operations of the system 300, reducing the complexity of determining the cause of errors occurring in the operation thereof (e.g., via the error attribution system 312).

Figure 4A:
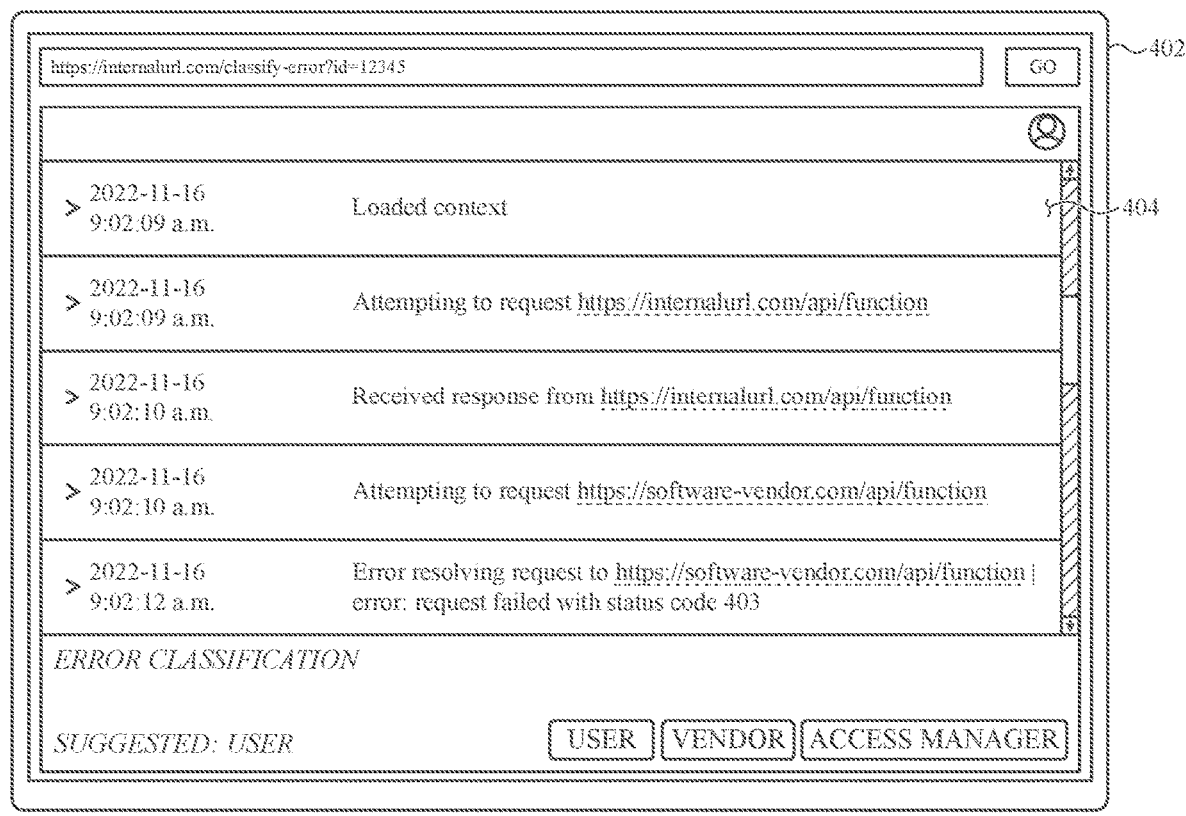
FIGS. 4A-4C depict a client device executing an instance of a client application rendering a graphical user interface of a system configured to provide access management as a service with automatic error attribution.

FIG. 4A depicts a client device 400 executing an instance of a client application rendering a graphical user interface of a system configured to automatically determine the cause of errors occurring in the operation of the system.

The client device 400 includes a display 402 that can be operated by an instance of software initiated by cooperation of a processor and memory (not shown). The instance of software may be referred to as a frontend application, and may cause to be rendered on the display a graphical user interface 404. The graphical user interface 404 can include a content view area in which content associated with the frontend application can be rendered.

The frontend application is configured to facilitate the classification of a set of logs describing operations of an access management system during the occurrence of an error with a cause of the error. Accordingly, the frontend application may render the set of logs in a list or expandable list, including a date and time at which the log was generated and content of the log. As discussed herein, a log describes one or more operations of a system. The user interface may allow a user to expand a log to view additional information about the log, such as additional details, system metrics such as memory usage, processor usage, network usage, at the time the log was generated, request parameters for a network request, or any other additional information that may be part of or otherwise associated with a log.

In addition to the logs, the frontend application may also render a number of user interface elements allowing a user to specify a cause of the error as the access management system itself (e.g., due to a bug in the codebase thereof or an outage), a system operated by or on behalf of a third-party software vendor (e.g., due to a bug in the codebase thereof or an outage), or due to user error. Those familiar with the access management system will be capable of analyzing the logs to determine the cause of the error and specify it via the user interface as such. In some embodiments, a suggested classification may also be rendered, providing the user with a starting point for determining the cause of the error. The suggested classification may be based on hard-coded patterns, application of a machine learning model as discussed herein, or any other information.

Notably, the user for the frontend application is an internal team member associated with the access management system, and not an MSP, such as a customer support technician for the access management system. Team members associated with the access management system are often required to diagnose errors in the operation thereof, and thus are familiar with the causes of various errors and the logs associated therewith. The frontend application may thus allow team members to easily indicate the causes of various errors in the system, which may be aggregated over time to provide a labeled data set including sets of logs and associated causes of errors.

Figure 4B:
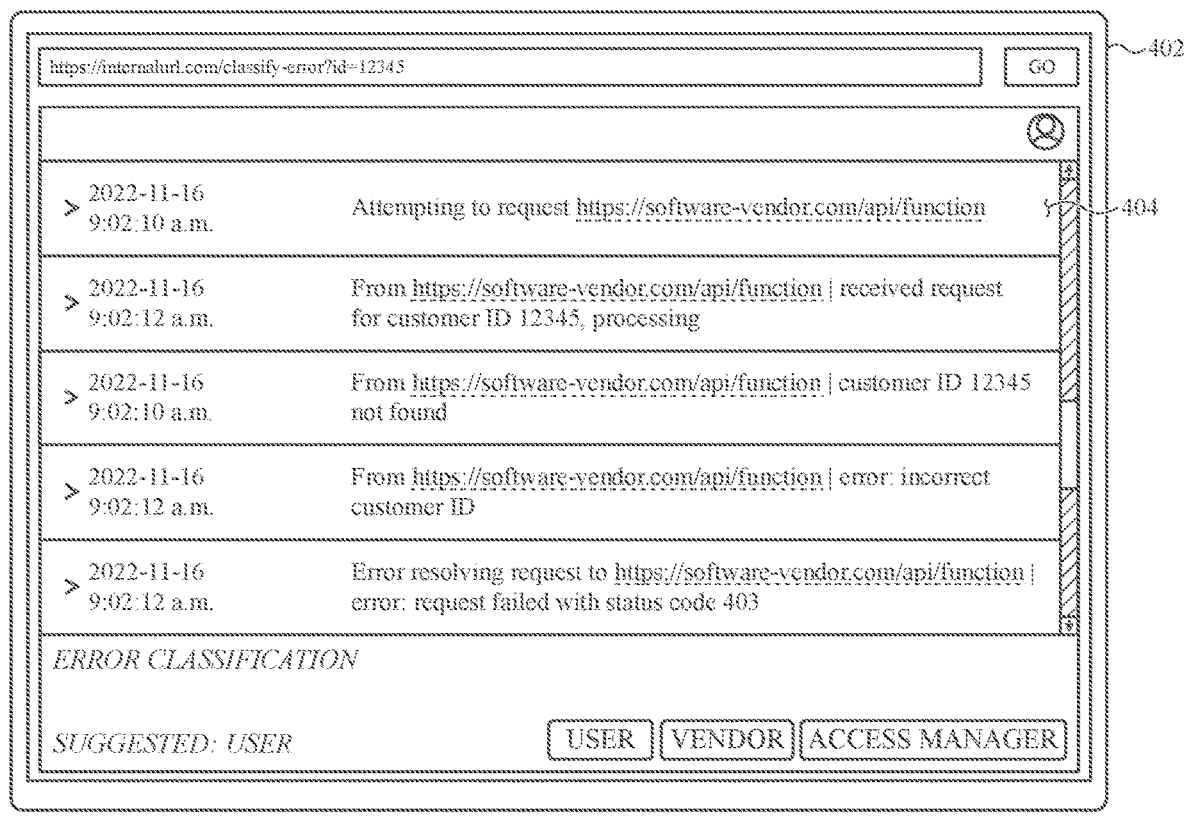

FIG. 4B shows the client device 400 including the display 402 rendering a different graphical user interface 404 showing aggregated logs including vendor logs in addition to logs generated by an access management system. Vendor logs may be indicated as originating from a particular vendor (e.g., "From https://software-vendor/api/function" in FIG. 4B). The vendor logs, along with the logs generated by the access management system, may give further context to errors occurring in the operation of the system, allowing for more accurate or quicker determination of a cause of the error and classification thereof.

Figure 4C:
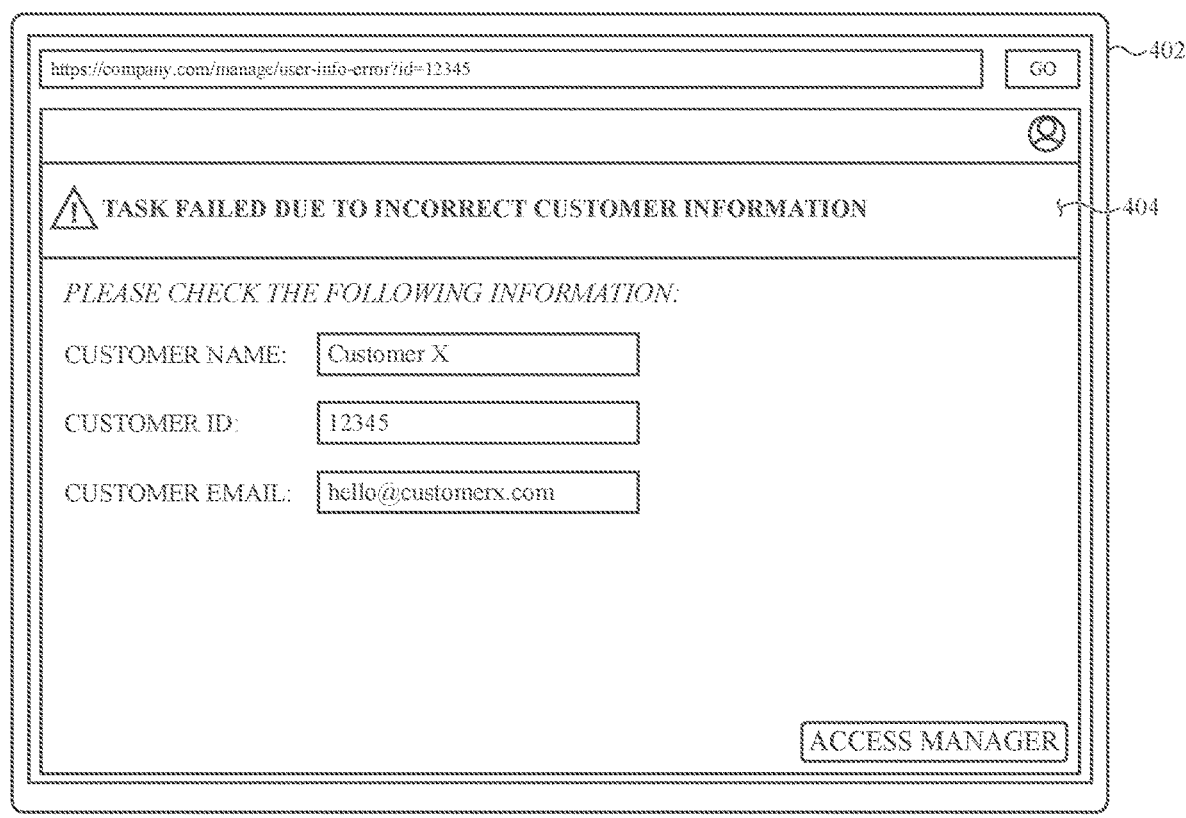

FIG. 4C shows the client device 400 including the display 402 rendering a different graphical user interface 404 guiding a user of the access management system to correct incorrect usage thereof. Rather than the target user being an internal team member associated with the access management system as in FIGS. 4A and 4B, the graphical user interface 404 in FIG. 4C is intended for customers of the access management system (i.e., MSPs using the access management system). The graphical user interface 404 may be displayed in response to the automatic determination that an error in the system was caused by user error as discussed herein. In particular, the graphical user interface 404 may be displayed in response to determining that incorrect customer information for a customer of the MSP was provided. Accordingly, the graphical user interface 404 walks the user through providing the correct customer information, and may re-initiate the failed operation upon correction thereof.

Notably, FIG. 4C is one of myriad examples of graphical user interfaces that may be generated to display information about the cause of an error automatically detected by a system according to principles of the present disclosure. Other examples include alerts for internal team members associated with the access management system, alerts for MSPs using the access management system, notices of outages of the access management system or third-party systems, or the like.

The foregoing embodiments depicted in FIGS. 4A-4C and the various alternatives thereof and variations thereto are presented, generally, for purposes of explanation, and to facilitate an understanding of various configurations and constructions of a user interface that may be associated with a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that may modifications and variations are possible in view of the above teachings.

Figure 5:
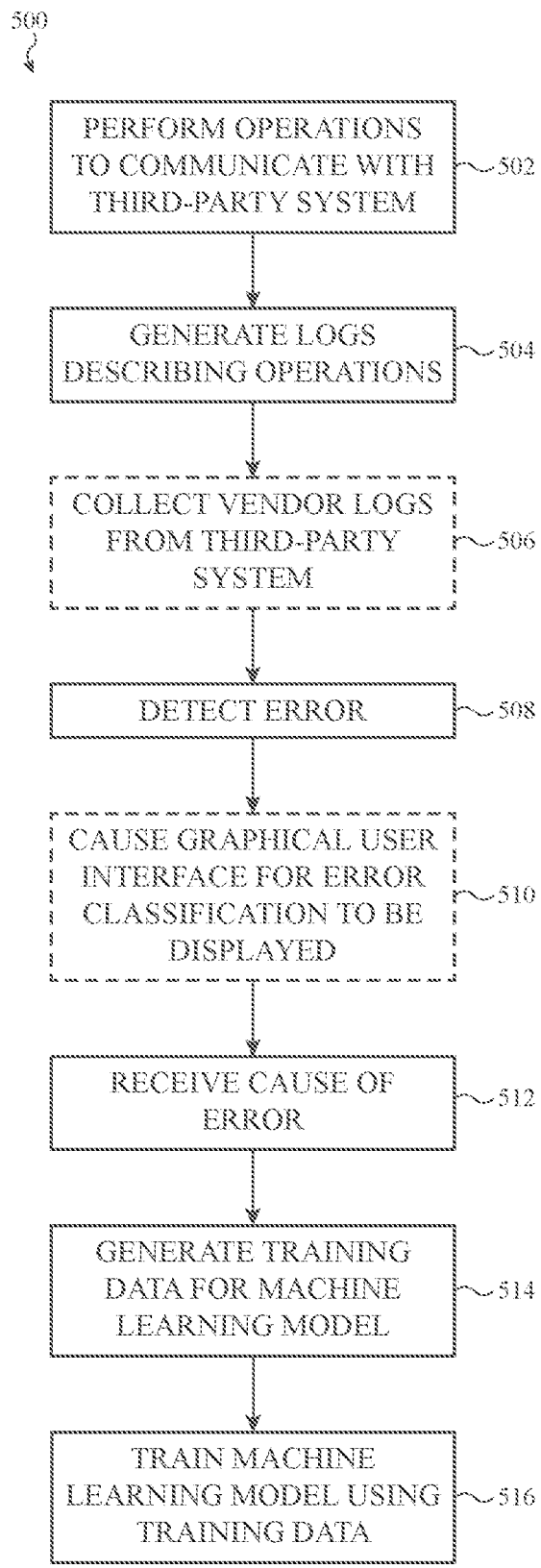
FIG. 5 is a flowchart depicting example operations of a method for providing access management as a service with automatic error attribution.

FIG. 5 is a method diagram depicting a flowchart of operations of a method 500 of operating an access management system to provide automatic error attribution.

The method 500 includes operation 502 at which a number of operations are performed to communicate with a third-party system in order to manage a license for a third-party software tool. As discussed above, this may include obtaining, cancelling, or modifying a license or licenses for a third-party software tool, obtaining information related to the usage of one or more third-party software tools, or any other functions performed in the operation of access management as a service as discussed above. The operations may include generating a request to an API endpoint provided by the third-party system, providing an API endpoint with which the third-party system can communicate, a combination thereof, or any other operations. Operation 504 may occur simultaneously with operation 502, at which logs describing the operations to communicate with the third-party system (and any other operations performed by the access management system) are generated. Those skilled in the art will appreciate that logs may be generated explicitly by logging statements in the code base of the access management system, by one or more software libraries utilized by the access management system, by an operating system running the access management system, by hardware associated with the access management system, or in any other manner. Optional operation 506 includes collecting vendor logs from the third-party system. As discussed above, vendor logs describe operations of software instantiated by the third-party system in response to requests or commands from the access management system, and may provide additional context that is helpful in the attribution of errors. The vendor logs may be collected as part of a response to a request initiated by the access management system or by an interface established by the access management system for receiving the vendor logs from the third-party system.

At operation 508, an error is detected related to one or more of the operations to communicate with the third-party system. The error may be detected in any suitable manner, such as via check statements, tests, or monitoring. In response to the detection of an error, a graphical user interface may optionally be caused to be displayed at operation 510, the graphical user interface showing details of the logs and user interface elements allowing a user to indicate a cause of the error. The graphical user interface may be displayed at a frontend application instance instantiated by a client device in communication with a backend software instance providing the access management system. A user may indicate a cause of the error based on the logs, causing the cause of the error to be received at operation 512. However, the cause of the error may also be received in any suitable manner. For example, the cause of the error may be indicated outside the scope of the operation of the access management system (i.e., in a separate system), and provided to the access management system. Regardless of how the cause of the error is received, at operation 514 training data for a machine learning model is generated from the logs and the cause of the error. In particular, the logs and the cause of the error may be aggregated with other logs and other causes of errors to generate a data set. Those skilled in the art will appreciate that the data set may be a labeled data set suitable for supervised training of a machine learning model. However, the present disclosure is not limited only to supervised training as discussed below.

Upon the accumulation of a suitable number of data points, a machine learning model may be trained using the training data at operation 516. As discussed above, the machine learning model may be a supervised machine learning model such as a random forest model, a k-nearest neighbor model, or a naïve Bayes model. However, the machine learning model may also be an unsupervised model such as a k-means clustering model, or a Gaussian mixture model. Notably, the present disclosure contemplates the use of any suitable type of machine learning model suitable for providing the functionality discussed herein.

In various embodiments, the training process depicted in FIG. 5 is performed until a suitable number of data points have been accumulated to provide suitable training data. In other embodiments, the training process is continuously or periodically repeated so that the training data, and thus the machine learning model, continues to be refined over time.

Figure 6:
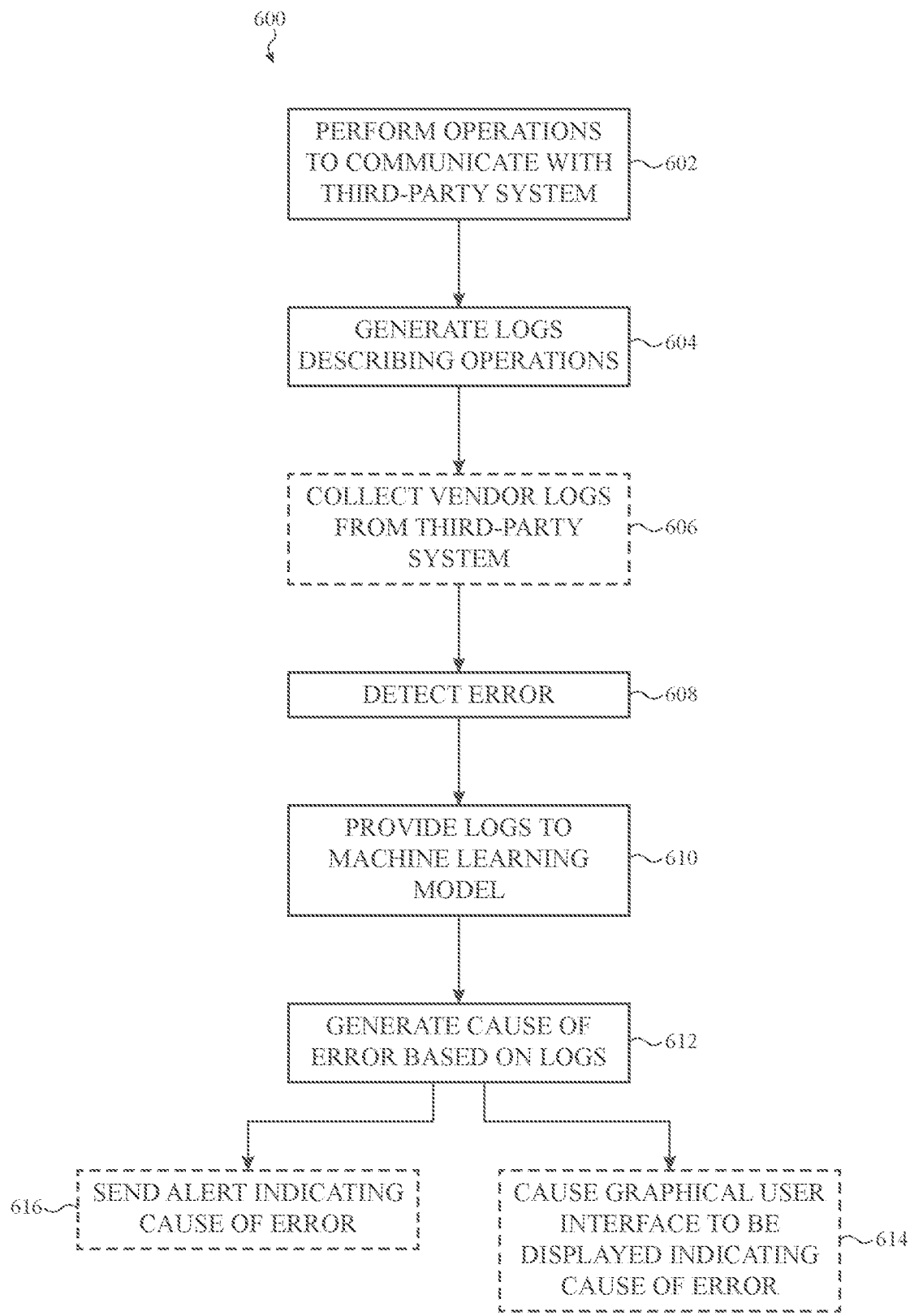
FIG. 6 is a flowchart depicting example operations of a method for providing access management as a service with automatic error attribution.

FIG. 6 is another method diagram depicting a flowchart of operations of a method 600 of operating an access management system to provide automatic error attribution.

In particular, the method 600 describes operations of the access management system after a training phase such as the one described in FIG. 5 has occurred, such that a trained machine learning model exists. In operation 602, a number of operations are performed to communicate with a third-party system in order to manage a license for a third-party software tool. As discussed above, this may include obtaining, cancelling, or modifying a license or licenses for a third-party software tool, obtaining information related to the usage of one or more third-party software tools, or any other functions performed in the operation of access management as a service as discussed above. The operations may include generating a request to an API endpoint provided by the third-party system, providing an API endpoint with which the third-party system can communicate, a combination thereof, or any other operations. Operation 604 may occur simultaneously with operation 602, at which logs describing the operations to communicate with the third-party system (and any other operations performed by the access management system) are generated. Those skilled in the art will appreciate that logs may be generated explicitly by logging statements in the code base of the access management system, by one or more software libraries utilized by the access management system, by an operating system running the access management system, by hardware associated with the access management system, or in any other manner. Optional operation 606 includes collecting vendor logs from the third-party system. As discussed above, vendor logs describe operations of software instantiated by the third-party system in response to requests or commands from the access management system, and may provide additional context that is helpful in the attribution of errors. The vendor logs may be collected as part of a response to a request initiated by the access management system or by an interface established by the access management system for receiving the vendor logs from the third-party system.

At operation 608, an error is detected related to one or more of the operations to communicate with the third-party system. The error may be detected in any suitable manner, such as via check statements, tests, or monitoring. In response to the detection of an error, the logs, and, optionally, the vendor logs, may be provided to a machine learning model in operation 610. As discussed above, the machine learning model may be trained using training data comprising previously generated logs describing previously performed operations of the access management system resulting in an error, as well as the cause of the error (which, as discussed above, may be provided by a person or otherwise as part of the training data). In some embodiments, the training data may also include vendor logs related to the error. In operation 612, a cause of the error is generated from the machine learning model, which is based on the logs and, optionally, the vendor logs. In optional operation 614, a graphical user interface may be caused to be displayed indicating the cause of the error. For example, a pop-up may be generated indicating the cause of the error, a user may be redirected to a page explaining the cause of the error and, optionally, guiding the user through mitigation or remediation efforts as discussed above. Further, an alert may be sent indicating the cause of the error in operation 616. Depending on the cause of the error, an alert may be sent, for example, to internal team members associated with the access management system, to the third-party system or another system associated with the same third-party, or to a user of the system.

Figure 7:
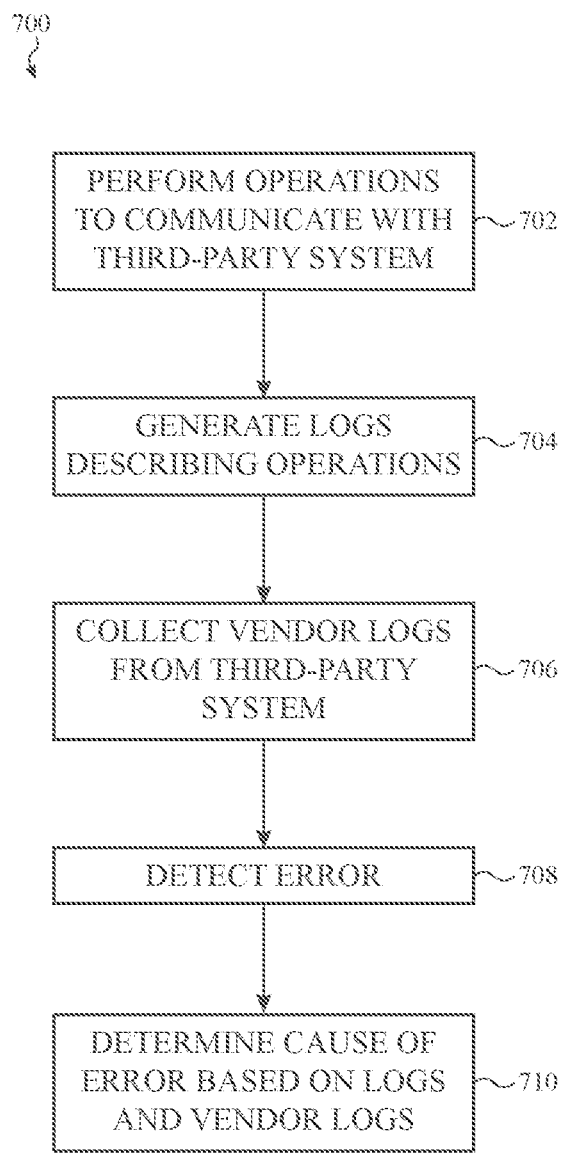
FIG. 7 is a flowchart depicting example operations of a method for providing access management as a service with automatic error attribution.

FIG. 7 is a method diagram depicting a flowchart of operations of a method 700 of operating an access management system to provide automatic error attribution.

The method 700 includes operation 702 at which a number of operations are performed to communicate with a third-party system in order to manage a license for a third-party software tool. As discussed above, this may include obtaining, cancelling, or modifying a license or licenses for a third-party software tool, obtaining information related to the usage of one or more third-party software tools, or any other functions performed in the operation of access management as a service as discussed above. The operations may include generating a request to an API endpoint provided by the third-party system, providing an API endpoint with which the third-party system can communicate, a combination thereof, or any other operations. Operation 704 may occur simultaneously with operation 702, at which logs describing the operations to communicate with the third-party system (and any other operations performed by the access management system) are generated. Those skilled in the art will appreciate that logs may be generated explicitly by logging statements in the code base of the access management system, by one or more software libraries utilized by the access management system, by an operating system running the access management system, by hardware associated with the access management system, or in any other manner. Operation 706 includes collecting vendor logs from the third-party system. As discussed above, vendor logs describe operations of software instantiated by the third-party system in response to requests or commands from the access management system, and may provide additional context that is helpful in the attribution of errors. The vendor logs may be collected as part of a response to a request initiated by the access management system or by an interface established by the access management system for receiving the vendor logs from the third-party system.

At operation 708, an error is detected related to one or more of the operations to communicate with the third-party system. The error may be detected in any suitable manner, such as via check statements, tests, or monitoring. In response to detection of an error, a cause of the error may be determined based on the logs and the vendor logs in operation 710. This may be based on hard-coded patterns (which may be possible or more accurate due to the inclusion of the vendor logs), or via a machine learning approach as discussed above.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A server system comprising:
   a memory resource; and
   a processing resource operably intercoupled with the memory resource and configured to instantiate an instance of software configured to:
     perform a set of operations to communicate with a third-party system to manage a license for a third-party software tool;
     generate a set of logs describing the set of operations;
     detect an occurrence of an error related to one or more of the set of operations;
     in response to the detection of the error, provide the set of logs as an input to a machine learning model, the machine learning model having been trained using training data comprising:
       previously generated sets of logs describing previously performed sets of operations of the instance of software resulting in previous errors; and
       a cause of the previous errors; and
     generate, as an output of the machine learning model, a cause of the error.

2. The server system of claim 1, wherein the instance of software is further configured to cause a graphical user interface to be displayed, the graphical user interface indicating the cause of the error.

3. The server system of claim 2, wherein:
   the instance of software is a backend application instance configured to communicably couple to a frontend application instance instantiated by a client device communicably coupled to the server system; and
   the graphical user interface is displayed at the frontend application instance.

4. The server system of claim 1, wherein the cause of the error indicates whether the error was caused by the instance of software or the third-party system.

5. The server system of claim 1, wherein the instance of software is further configured to:
   collect a set of vendor logs describing a set of operations of an instance of software instantiated by the third-party system in response to communications with the instance of software, wherein:
     the set of vendor logs is provided as an input to the machine learning model; and
     the training data further comprises previously collected vendor logs describing previously performed sets of operations of instances of software instantiated by the third-party system resulting in previous errors.

6. The server system of claim 5, wherein the cause of the error indicates whether the error was caused by the instance of software or the third-party system.

7. The server system of claim 5, wherein the instance of software is further configured to:
   in response to determining that the cause of the error is the third-party system, communicating the cause of the error to the third-party system.

8. The server system of claim 5, wherein the instance of software is further configured to:

cause a graphical user interface to be displayed, the graphical user interface indicating the cause of the error.

9. The server system of claim 1, wherein the set of operations comprises generating a request to the third-party system.

10. The server system of claim 1, wherein the set of operations comprises providing an interface for receiving communications from the third-party system.

11. A server system comprising:
a memory resource; and
a processing resource operably intercoupled with the memory resource and configured to instantiate an instance of software configured to:
perform a set of operations to communicate with a third-party system to obtain information in respect of a license for a third-party software tool;
detect an occurrence of an error related to performance of the set of operations;
aggregate a set of logs generated in respect of performance of the set of operations;
receive, as input from an agent via a user interface, an attribution to an identified system, the attribution indicating a cause of the error;
generate or update training data in response to the input, the training data based on the set of logs and comprising the attribution as a label; and
train or retrain a machine learning model using the generated or updated training data, the trained machine learning model configured to:
receive, as a new input, a new set of logs generated in respect of a new set of operations that resulted in occurrence of a new error; and
provide, as a new output, an attribution in respect of the new error based on the new input.

12. The server system of claim 11, wherein aggregating the set of logs generated in respect of performance of the set of operations comprises:
retrieving a set of vendor logs generated by the third-party system in response to communications with the instance of software.

13. A server system comprising:
a memory resource; and
a processing resource operably intercoupled with the memory resource and configured to instantiate an instance of software configured to:
perform a set of operations to communicate with a third-party system via a software interface to obtain information in respect of user of a license to access a third-party software tool;
detect an occurrence of an error while performing the set of operations;
retrieve a first set of logs from a database communicably coupled to the first instance of software, the first set of logs generated in respect of performance by the instance of software of the set of operations;
retrieve a second set of logs from the third-party system, the second set of logs generated by the third party system in respect of at least one action taken by the third party system, the at least one action in response to at least one operation of the set of operations;
aggregate the first set of logs and the second set of logs as a third set of logs;
provide the third set of logs as input to a trained machine learning model, the trained machined learning model having received, as training data, aggregated prior first party and third party logs;
receive, as output from the trained machine learning model, an attribution of the error, the attribution identifying at least one of the instance of software, the third party system, the third party software tool, or the user as a probable source of the error.

* * * * *